US011411875B1

(12) United States Patent
Arimanda et al.

(10) Patent No.: US 11,411,875 B1
(45) Date of Patent: Aug. 9, 2022

(54) NETWORK TRAFFIC CONTROL BASED ON APPLICATION IDENTIFIER

(71) Applicant: Juniper Networks, Inc., Sunnyvale, CA (US)

(72) Inventors: Sravanthi Arimanda, Bangalore (IN); Rajeev Chaubey, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 228 days.

(21) Appl. No.: 16/835,941

(22) Filed: Mar. 31, 2020

(51) Int. Cl.
*H04L 47/2441* (2022.01)
*H04L 45/745* (2022.01)
*H04L 45/302* (2022.01)
*H04L 47/20* (2022.01)
*H04L 9/40* (2022.01)
*H04L 43/028* (2022.01)

(52) U.S. Cl.
CPC ........ *H04L 47/2441* (2013.01); *H04L 43/028* (2013.01); *H04L 45/306* (2013.01); *H04L 45/745* (2013.01); *H04L 47/20* (2013.01); *H04L 63/0245* (2013.01)

(58) Field of Classification Search
CPC . H04L 47/2441; H04L 43/028; H04L 45/306; H04L 45/745; H04L 47/20; H04L 63/0245
USPC ........................................................ 370/235
See application file for complete search history.

(56) References Cited

U.S. PATENT DOCUMENTS

| 7,069,330 | B1* | 6/2006 | McArdle | H04L 63/0227 |
| | | | | 709/227 |
| 8,745,179 | B2* | 6/2014 | Raghavan | H04L 41/0856 |
| | | | | 709/221 |
| 9,912,699 | B1* | 3/2018 | Hebbar | H04L 69/326 |
| 2003/0204719 | A1* | 10/2003 | Ben-Itzhak | G06F 21/51 |
| | | | | 713/152 |
| 2016/0373323 | A1* | 12/2016 | Xu | H04L 67/12 |

OTHER PUBLICATIONS

Sravanthi Arimanda et al., "Network Traffic Control Based On Application Path," U.S. Appl. No. 16/439,236, filed Jun. 12, 2019.

* cited by examiner

*Primary Examiner* — Kwang B Yao
*Assistant Examiner* — Syed M Bokhari
(74) *Attorney, Agent, or Firm* — Harrity & Harrity, LLP

(57) ABSTRACT

A network device may receive network traffic associated with a session, wherein the session is associated with a network. The network device may determine, from the network traffic, an application path that is associated with the session and may determine an application path identifier associated with the application path. The network device may determine, based on policy information that is associated with the application path identifier, whether the network traffic associated with the session is permitted to be communicated via the network and may perform, based on whether the network traffic is determined to be permitted, an action associated with communication of the network traffic.

20 Claims, 9 Drawing Sheets

Application to Application Path Identifier Mapping

| Application | Application Path Classification Segment 1 | Application Path Identifier 1 | ... | Application Path Classification Segment N | Application Path Identifier N |
|---|---|---|---|---|---|
| HTTP | *.HTTP.* | HTTP-ALL | ... | | |
| DNS | *.SSL.DNS | SECURE-DNS | ... | *.HTTP.DNS | SECURE-DNS |
| SSL | *.SSL.+ | SECURE-WEB-TRAFFIC-ALL | ... | | |
| ... | ... | ... | ... | ... | ... |

| Policy Mapping | |
|---|---|
| Application / Application Path Identifier | Action |
| DNS | Allow |
| HTTP-ALL | Allow |
| SECURE-DNS | Deny |
| SECURE-WEB-TRAFFIC-ALL | Deny |
| ... | ... |

NETWORK TRAFFIC CONTROL BASED ON APPLICATION IDENTIFIER

BACKGROUND

A network device, such as a firewall device or other security device, of a network may be used to allow or block network traffic associated with the network. For example, the network device may use a set of policies to permit or deny network traffic sent to the network, network traffic sent from the network, and/or network traffic sent within the network.

SUMMARY

According to some implementations, a method may include receiving, by a network device, network traffic, wherein the network traffic is associated with a session associated with a network; determining, by the network device, an application path associated with the network traffic; determining, by the network device, an application path identifier associated with the application path; performing, by the network device, a lookup operation associated with the application path identifier to identify policy information associated with the application path identifier; determining, by the network device and based on the policy information, whether the network traffic can be communicated via the network; and permitting, by the network device, when the network traffic is determined to be able to be communicated via the network, communication of the network traffic via the network, or preventing, by the network device, when the network traffic is determined to not be able to be communicated via the network, communication of the network traffic via the network.

According to some implementations, a network device may include one or more memories and one or more processors. The one or more processors may be configured to receive network traffic associated with a session involving a network; identify an application path from the network traffic; determine an application path identifier associated with the application path; obtain, from a policy mapping, policy information associated with the application path identifier, determine, based on the policy information, whether communication of network traffic associated with the session is permitted via the network; and perform, based on whether communication of the network traffic is permitted via the network, an action associated with the network traffic.

According to some implementations, a non-transitory computer-readable medium may store one or more instructions. The one or more instructions, when executed by one or more processors of a network device, may cause the one or more processors to receive network traffic associated with a session, wherein the session is associated with a network; determine, from the network traffic, an application path that is associated with the session; determine an application path identifier associated with the application path; determine, based on policy information that is associated with the application path identifier, whether the network traffic associated with the session is permitted to be communicated via the network; and perform, based on whether the network traffic is determined to be permitted, an action associated with communication of the network traffic.

BRIEF DESCRIPTION OF THE DRAWINGS

FIGS. 2A-2B are diagrams of an example application to application path identifier mapping and an example policy mapping described herein.

DETAILED DESCRIPTION

Figure 1:
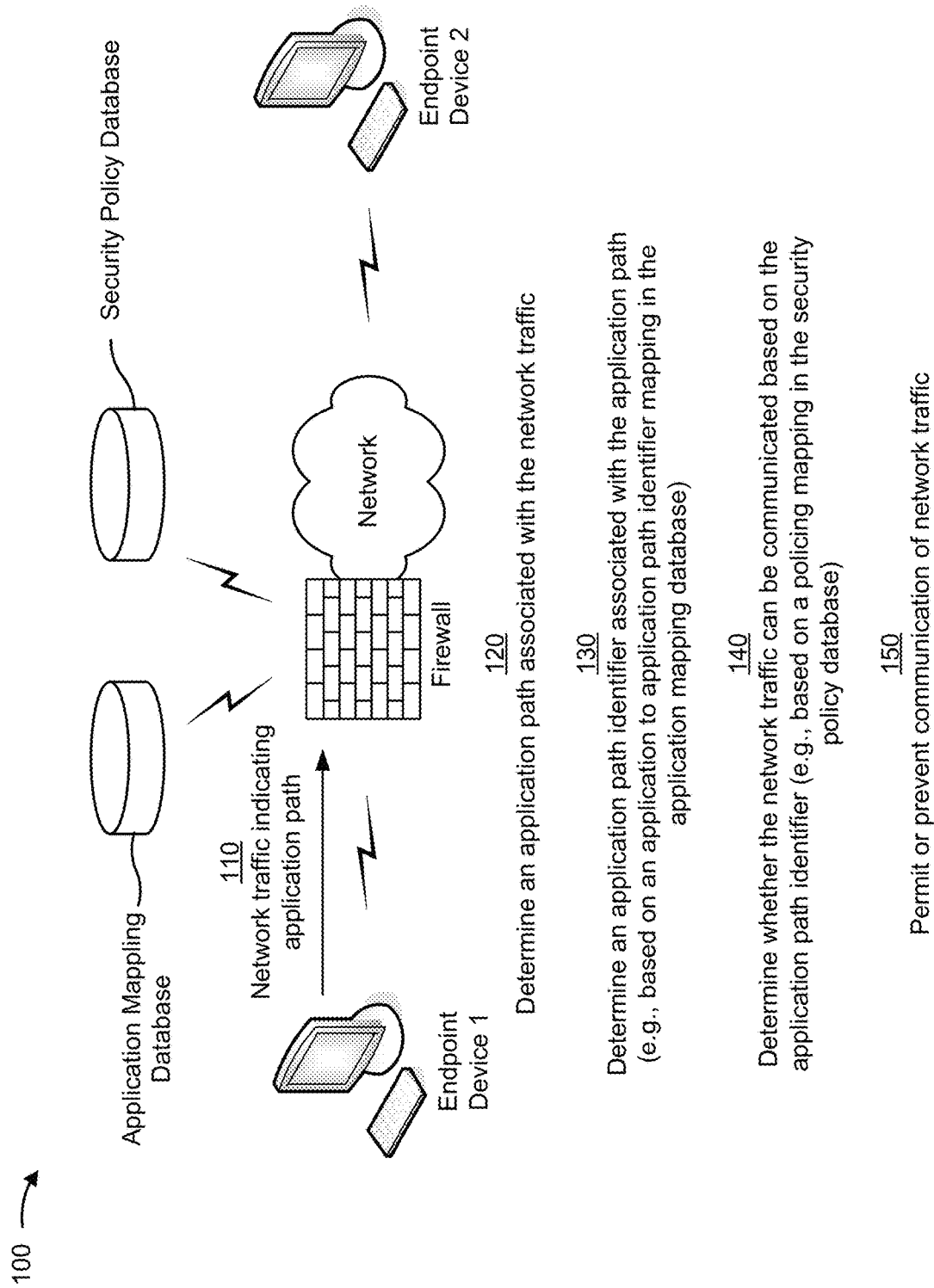
FIG. 1 is a diagram of one or more example implementations described herein.

The following detailed description of example implementations refers to the accompanying drawings. The same reference numbers in different drawings may identify the same or similar elements.

A firewall may be used to allow, deny, rate limit, or enforce other actions on network traffic based on a policy implemented by the firewall and one or more characteristics of the network traffic. Such a policy may be a communication-protocol-based policy that allows or denies a communication based on the communication protocol of the communication. Accordingly, a firewall that uses such a communication-protocol-based policy may allow or deny network traffic (e.g., communication of the network traffic) within a network depending on the communication protocol used to communicate the network traffic. However, if a particular policy is to deny network traffic via a particular communication protocol, such a communication-protocol-based policy causes the firewall to prevent any or all network traffic that is to be communicated via that communication protocol. Moreover, in some instances, certain network traffic must be transmitted and/or received by an endpoint device of a network via a communication protocol that is to be blocked or denied by a communication-protocol-based policy. Accordingly, such network traffic may be unable to bypass the firewall if the firewall is configured to utilize such a communication-protocol-based policy, regardless of the content of the network traffic, regardless of whether a source or a destination needs to receive the network traffic for a particular purpose, regardless of whether the network traffic contains malware, and/or the like.

In some instances, certain applications are configured for use with certain communication protocols. Accordingly, a communication-protocol based network policy may block communication protocols that are to be used with a particular application. The network traffic associated with an application may not be able to reach an endpoint of a network unless the firewall uses a policy that allows network traffic associated with an application protocol associated with the application. Such a policy may conflict with a communication-protocol-based policy if network traffic associated with the application protocol is to be communicated via a communication protocol that is to be blocked by the communication-protocol-based policy. A firewall may be configured (e.g., by a user, such as a network administrator) to enforce policies that allow an application protocol to communicate using a particular communication protocol. However, if the communication protocol is to be denied for one or more other application protocols, corresponding policies need to be individually created and applied to deny that network traffic for the one or more other application protocols. As an example, if the firewall is to allow network traffic to be communicated via a communication protocol for only a single application protocol, hundreds or thousands of policies may need to be written to deny network traffic associated with any other application protocols that may be communicated via that communication protocol (because a single communication-protocol-based policy cannot be written since it would deny network traffic associated with that single application protocol). Accordingly, several computing resources (e.g., processing resources, memory resources, storage resources, and/or the like) may be consumed to create, store, and enforce these policies.

Some implementations described herein permit a network device to be configured with one or more policies for network traffic based on an application path identifier associated with an application path of the network traffic. As described herein, such a policy can be enforced by the firewall to only allow network traffic associated with a particular application path identifier. Accordingly, the firewall may utilize an application-path-identifier-based policy (rather than a communication-protocol-based policy) that permits network traffic associated with a particular application path identifier but denies network traffic associated with another application path identifier.

As described herein, the firewall may identify (e.g., in a packet of a data communication) the application path and an associated application path identifier (e.g., based on an application included int the application path). The network device may determine, based on policy information that is associated with the application path identifier, whether the network traffic associated with the session is permitted to be communicated and may permit or prevent, based on whether the network traffic is determined to be permitted, communication of the network traffic.

In this way, a network device may use an application-path-identifier-based policy that is more granular, wider, and/or the like relative to a communication-protocol-based policy and prevents unwanted dropping of network traffic due to a communication protocol associated with the network traffic, without requiring individual policies to be created, stored, and/or enforced for all applications that may be associated with network traffic communicated via the network. In this way, a network device conserves resources (e.g., computing resources and/or network resources) that would otherwise be wasted transmitting and/or processing network traffic that would be dropped based on a communication-protocol-based policy.

FIG. 1 is a diagram of one or more example implementations 100 described herein. As shown in FIG. 1, example implementation(s) 100 may include a first endpoint device (shown as "Endpoint Device 1"), a second endpoint device (shown as "Endpoint Device 2"), a network, a firewall, an application mapping database (e.g., a data structure that stores an application to application path identifier mapping for the firewall), and a security policy database (e.g., a data structure that stores a policy mapping and/or policy information for the firewall). As shown, the application mapping database and the security policy database are communicatively coupled with the firewall.

In example implementation(s) 100, the firewall may be implemented by a network device (e.g., may be included within the network device) that manages communication (or flow) of network traffic to the network, from the network, and/or within the network. Additionally, or alternatively, the firewall may be included within and/or may be a firewall of the first endpoint device or the second endpoint device. In some implementations, the application mapping database and/or the security policy database may be included within the network device that implements the firewall and/or another network device that is accessible to the network device.

The first endpoint device and the second endpoint device may be communicatively coupled via the network. Accordingly, in order for the first endpoint device to transmit a data communication to the second endpoint device, the firewall needs to be configured to permit the data communication to pass through the network to the second endpoint device.

As described herein, the first endpoint device and/or the second endpoint device may host and/or run an application (e.g., a computer program, a mobile application, an online application, a cloud-based application, and/or the like) that is involved in a session. Accordingly, the first endpoint device and/or the second endpoint device, in association with the session, may transmit a data communication and/or network traffic associated with the session. As described in connection with example implementation(s) 100, the firewall may be configured (e.g., using one or more policies) to permit or prevent the communication of such network traffic via the network.

As shown in FIG. 1, and by reference number 110, the firewall receives network traffic indicating an application path. For example, the network traffic may be associated with a session (e.g., an application session, a communication session, and/or the like) that involves communicating network traffic via the network. The network traffic may include one or more data communications of messages, protocol data units (PDUs) (e.g., packets or other units of data), and/or the like.

The session may be associated with an application that utilizes and/or is associated with an application protocol and/or a communication protocol. As described herein, a session may be associated with a particular protocol stack that identifies particular protocols (e.g., communication protocols, security protocols, application protocols, and/or the like) that are to be utilized during the session. In some implementations, the application path may be representative of the protocol stack of a session. For example, the application path may include one or more elements (e.g., in a string, in a graph, or other type of representation) corresponding to layers of the protocol stack.

The protocol stack may correspond to an open systems interconnection (OSI) model. In such cases, a first layer (L1) of the protocol stack may be a physical layer for the session, a second layer (L2) of the protocol stack may be a data link layer for the session, a third layer (L3) may be a network layer for the session, a fourth layer (L4) may be a transport layer for the session, a fifth layer (L5) may be a session layer for the session, a sixth layer (L6) may be a presentation layer for the session, and/or a seventh layer (L7) may be an application layer for the session. One or more layers of the protocol stack may be referred to herein as a communication protocol or an application protocol. For example, depending on available information associated with a session and/or a particular application path, a communication protocol may correspond to one or more of L5 or L6, while an application protocol may correspond to L7. In some implementations, the communication protocol may correspond to L7 and an application protocol may correspond to a layer that is above L7 (e.g., application specific protocols). In some implementations, described herein, the protocol stack may be generalized to include one or more application protocols over (in a next layer above) one or more communication protocols.

Accordingly, during a session, network traffic may include data that is configured and/or formatted for a particular protocol of the protocol stack and/or formatted as per an adjacent layer in the stack. For example, data for an application protocol may be formatted for the adjacent communication protocol layer. More specifically, application data of a session may be formatted over hypertext transfer protocol (HTTP) (an application protocol) data, and the HTTP data may be formatted over a transmission control protocol (TCP) (a communication protocol) data, and so on. Other examples of application protocols may include a domain name system (DNS) protocol; a transmission control protocol (TCP); a user datagram protocol (UDP); a secure socket layer (SSL) protocol; a transport layer security (TLS) protocol; a quick UDP Internet connection (QUIC) protocol; a SOCKS protocol (e.g., SOCKS4, SOCKS5, and/or the like), and/or the like. As mentioned above, in some implementations, for a particular session, an application protocol may be determined to be in a layer of the protocol stack that corresponds to a communication protocol for another session. Accordingly, other examples of communication protocols may include the DNS protocol, the UDP, the SSL protocol, the TLS protocol, the QUIC protocol, the SOCKS protocol, and/or the like.

In some implementations, the application protocol may be appended (e.g., towards an end of the application path associated with an upper layer of the protocol stack) or included within an application path (e.g., in the middle of the application path corresponding to a middle layer of the protocol stack). For example, the application protocol may correspond to a top layer of the protocol stack. Accordingly, remaining elements of the application path (e.g., corresponding to the lower layers of the protocol stack) may be determined to be a communication protocol. For example, the communication protocol may correspond to an intermediate layer of the protocol stack.

In some implementations, the network traffic includes a plurality of communications (e.g., a plurality of messages, PDU transmissions, and/or the like) that are to facilitate a session involving the first endpoint device and the second endpoint device. For example, the first endpoint device may send network traffic via the network for the session, and/or the second endpoint device may correspondingly reply with network traffic for the session (or vice versa). Accordingly, the firewall may receive and/or intercept the network traffic to determine whether the network traffic and/or a session associated with the network traffic can be communicated via the network (e.g., according to a policy defined in the policy mapping).

In this way, the firewall may receive (and/or intercept) network traffic that is communicated and/or is to be communicated via the network to allow the firewall to determine whether to permit or prevent communication of the network traffic.

As further shown in FIG. 1, and by reference number 120, the firewall identifies and/or determines an application path associated with the network traffic. For example, the firewall may preprocess and/or parse the application path from the network traffic. More specifically, the firewall, using a deep packet inspection (DPI), may identify a PDU of the network traffic that is associated with the application path (e.g., associated with one or more layers of the protocol stack of the session). The firewall may extract and/or parse the application path from the PDU. Accordingly, the firewall may determine, from the data communication, the application path from the network traffic.

As shown by reference number 130, the firewall identifies and/or determines an application path identifier associated with the application path. In some implementations, the firewall (e.g., using DPI) may analyze the application path to determine and/or identify the application path identifier associated with the application path.

As an example, the firewall may parse the application path to identify an application included in the application path (e.g., in an application protocol or a communication protocol of the application path). The firewall may perform a lookup operation that involves scanning the application to application path identifier mapping (e.g., stored in the application mapping database) for an entry associated with the application. The entry (e.g., as further described herein in relation to FIG. 2A) may identify the application, one or more application path classification segments, and one or more application path identifiers respectively associated with the one or more application path classification segments. In some implementations, the firewall may compare at least one of the one or more application path classification segments of the entry and the application path. When the firewall determines that an application path classification segment matches or corresponds to at least a portion of the application path (e.g., the application path includes the application path classification segment), the firewall may obtain the application path identifier that is associated with the application path classification segment in the entry. In this way, the firewall identifies and/or determines the application path identifier associated with the application path.

In a specific example, the firewall may parse the application path to identify SSL as an application included in the application path. The firewall may perform a lookup operation that involves scanning the application to application path identifier mapping for an entry associated with SSL that, as shown in FIG. 2A, identifies a first application path classification segment *.SSL.* and a second application path classification segment *.SSL that are each associated with an application path identifier SECURE-WEB-TRAFFIC-ALL. The firewall may determine that the first application path classification segment and/or the second application path classification matches or corresponds to at least a portion of the application path and therefore that the application path identifier SECURE-WEB-TRAFFIC-ALL is associated with the application path.

As further shown in FIG. 1, and by reference number 140, the firewall may determine, from the policy mapping (e.g., stored in the security policy database), whether the network traffic can be communicated based on the application path identifier. As described herein, the network traffic may be associated with a session of an application that is to involve the first endpoint device and the second endpoint device communicating via the network. Accordingly, using policy information (e.g., information and/or data that identifies policies for permitting network traffic and/or policies for preventing network traffic) in the policy mapping, the firewall may determine whether network traffic associated with the session can be communicated via the network.

Upon receipt of the network traffic and/or determination of the application path identifier associated with the network traffic (e.g., the application path identifier associated with the application path of the network traffic), the firewall may perform a lookup operation that involves scanning the security policy database for policy information associated with the application path identifier.

According to some implementations, when performing the lookup operation, the firewall may locate, in the policy mapping, an entry associated with the application path identifier. As shown in FIG. 2B, the entry may identify the application path identifier and policy information. The policy information may indicate whether the network traffic is to be permitted (e.g., allowed) or prevented (e.g., denied) (corresponding to whether the network traffic can be communicated via the network).

In this way, the firewall may determine, based on policy information that is associated with the application path identifier, whether network traffic associated with the session is capable of being communicated via the network to allow the firewall to perform an action associated with the network traffic.

As further shown in FIG. 1, and by reference number 150, the firewall permits or prevents communication of the network traffic. For example, the firewall may perform one or more actions associated with permitting the network traffic to be communicated (e.g., enabling the data communication and/or network traffic to be communicated, forwarding the data communication and/or network traffic, and/or the like). As another example, the firewall may perform one or more actions associated with preventing the network traffic to be communicated (e.g., not forwarding the data communication and/or network traffic, blocking or dropping the data communication and/or network traffic, and/or the like).

Additionally, or alternatively, the firewall may perform one or more other actions when communication of the network traffic is permitted. For example, the firewall may set parameters for communication of network traffic via the session. Such parameters may include a data rate, a usable bandwidth for communication of the network traffic, timing parameters (e.g., time limits, scheduling, and/or the like) associated with the session, and/or the like. In this way, the firewall, when permitting communication of the network traffic for the session, may cause the network traffic to be communicated with particular parameters. Accordingly, the firewall may cause the session to be established via the network. In some implementations, the firewall may notify a source of the network traffic that the session can be established and/or that network traffic associated with the session can be communicated via the network (e.g., via an acknowledgement message).

Additionally, or alternatively, when communication of the network traffic associated with a session is to be prevented, the firewall may send a notification that reflects the same. In some implementations, such a notification may indicate the basis for the determination that the communication cannot be performed via the network. For example, the firewall may indicate that network traffic associated with an application path identifier cannot be communicated via the network.

In some implementations, the firewall may maintain a log of policies enforced in association with network traffic associated with the network. For example, the firewall may indicate, in the log, the application path identified from the network traffic and log whether or not communication of the network traffic was permitted or prevented. In some implementations, the firewall may log which entry, in the policy mapping, was used to permit or prevent the communication (e.g., to allow enforcement of that policy to be reviewed and/or verified for accuracy). Additionally, or alternatively, the firewall may log an application path identifier and/or policy information indicated by the entry. Accordingly, the firewall may utilize a log to permit the policy enforcement and/or one or more actions performed by the firewall to be reviewed, analyzed, and/or verified for accuracy.

In this way, the firewall may perform, based on whether communication of the network traffic is allowable via the network, one or more actions associated with the network traffic.

As indicated above, FIG. 1 is provided merely as one or more examples. Other examples may differ from what is described with regard to FIG. 1.

FIGS. 2A-2B are diagrams of one or more example implementations 200 described herein. As shown in FIG. 2A, example implementation(s) 200 includes an example application to application path identifier mapping (e.g., that is stored in the application mapping database) with a plurality of entries that are respectively associated with an application. Each entry may identify an application, one or more application path classification segments (shown as application path classification segments 1 through N, where N is greater than 1), one or more application path identifiers (shown as application path identifiers 1 through N, where N is greater than 1) respectively associated with the one or more application path classification segments, and/or the like. In this way, relationships between applications and application path identifiers may be represented (e.g., for each application) in a mapping (or table, such as a hash table) (e.g., of the application mapping database). Additionally, or alternatively, the information may be included in a list (e.g., a structured list sorted by application, an unstructured list, a linked list, and/or the like), an index (e.g., that indexes an application path identifier based on an application), a graph, and/or the like.

As shown in FIG. 2A, an application classification path segment may include one or more wildcard characters. In some implementations, a wild card character may indicate that zero or more application protocols may come before or after the wild card character. For example, as shown in FIG. 2A, an entry associated with the application HTTP includes an application path classification segment 1 with a value of *.HTTP.*, where the left asterisk (*) indicates that zero or more application protocols may come before the .HTTP. application path classification segment and the right asterisk indicates that zero or more application protocols may come after the .HTTP. application path classification segment. In this way, the application path segment 1 may match with or correspond to an application path that includes .HTTP. As further shown in FIG. 2A, the application path classification segment 1 of the entry associated with the application DNS is associated with an application path identifier HTTP-ALL, which indicates that network traffic that includes an application path that includes .HTTP. is associated with the application path identifier HTTP-ALL.

As another example, as shown in FIG. 2A, an entry associated with the application DNS includes an application path classification segment 1 with a value of *.SSL.DNS and an application path classification segment N with a value of *.HTTP.DNS. In this way, the application path classification segments may match with or correspond to an application path that ends in SSL.DNS or HTTP.DNS (e.g., an application path that includes DNS over a secure application). As further shown in FIG. 2A, each application path class segment is associated with an application path identifier SECURE-DNS, which indicates that network traffic that includes an application path that ends in SSL.DNS or HTTP.DNS is associated with the application path identifier SECURE-DNS.

In some implementations, a wild card character may indicate that one or more application protocols may come before or after the wild card character. For example, as shown in FIG. 2A, an entry associated with the application SSL includes an application path classification segment 1 with a value of *.SSL.+ (e.g., where the asterisk indicates that zero or more application protocols may come before the .SSL application path classification segment and the plus (+)

indicates that one or more application protocols may come after the .SSL application path classification segment). In this way, the application path classification segment 1 may match with or correspond to any application path that includes but does not end in .SSL. As further shown in FIG. 2A, the application path class segment is associated with an application path identifier SECURE-WEB-TRAFFIC-ALL, which indicates that network traffic that includes an application path that includes but does not end in .SSL is associated with the application path identifier SECURE-WEB-TRAFFIC-ALL.

As shown in FIG. 2A, an application, such as DNS, may be associated with one or more application path classification segments, which are respectively associated with an application path identifier. The firewall may identify and/or determine an application path identifier (e.g., as described herein in relation to FIG. 1 and reference number 130) for an application by selecting an entry of the one or more entries that is associated with the application and determining which application path classification segments of the entry match or correspond to a portion of the application path. The firewall may then select (e.g., identify and/or determine) an application path identifier associated with one of the matching and/or corresponding application path segments based on one or more criteria. For example, the firewall may select the application path identifier of the most recently updated application path classification segment.

An entry of the application to application path identifier mapping may be preconfigured (e.g., as part of an initial configuration of the application to application path identifier mapping). Additionally, or alternatively, the firewall may be configured to generate an entry according to one or more user inputs (e.g., one or more user inputs that identify and/or specify an application, one or more application path classification segments, and an application path identifier). In some implementations, the application to application path identifier mapping may be generated based on signature constructs that are part of a pre-packaged application signature package (also referred to as a sigpack) and user defined constructs that are configured for application path identifiers.

As shown in FIG. 2B, example implementation(s) 200 includes an example policy mapping (e.g., that is stored in the security policy database) with a plurality of entries that are respectively associated with either an application or an application path identifier. Each entry identifies an application or an application path identifier and policy information. In some implementations, the policy information may be represented (e.g., for each possible application or application path identifier) in a mapping (or table, such as a hash table) of the security policy database. Additionally, or alternatively, the policy information may be included in a list (e.g., a structured list sorted by application protocol, an unstructured list, a linked list, and/or the like), an index (e.g., that indexes the policy information based on an application or an application path identifier), a graph, and/or the like. The policy information may indicate whether the network traffic is to be permitted (e.g., allowed) or prevented (e.g., denied) (corresponding to whether the network traffic can be communicated via the network).

As shown in FIG. 2B, an entry associated with the application DNS includes policy information indicating an "allow" action that indicates that network traffic associated with the application DNS (e.g., network traffic with a DNS application protocol) is to be permitted. As further shown in FIG. 2B, an entry associated with the application path identifier SECURE-WEB-TRAFFIC-ALL includes policy information indicating a "deny" action that indicates that network traffic associated with the SECURE-WEB-TRAFFIC-ALL (e.g., network traffic that includes and/or ends in .SSL) is to be prevented.

In this way, by expanding policy mappings to include application path identifiers in addition to applications, no policy changes are required to achieve some of the implementations described herein. The same matching process and criteria can be used for the policy mapping described herein that uses application and/or application path identifiers as for existing policy mappings that use just applications.

As indicated above, FIGS. 2A-2B are provided merely as one or more examples. Other examples may differ from what is described with regard to FIGS. 2A and 2B.

Figure 3:
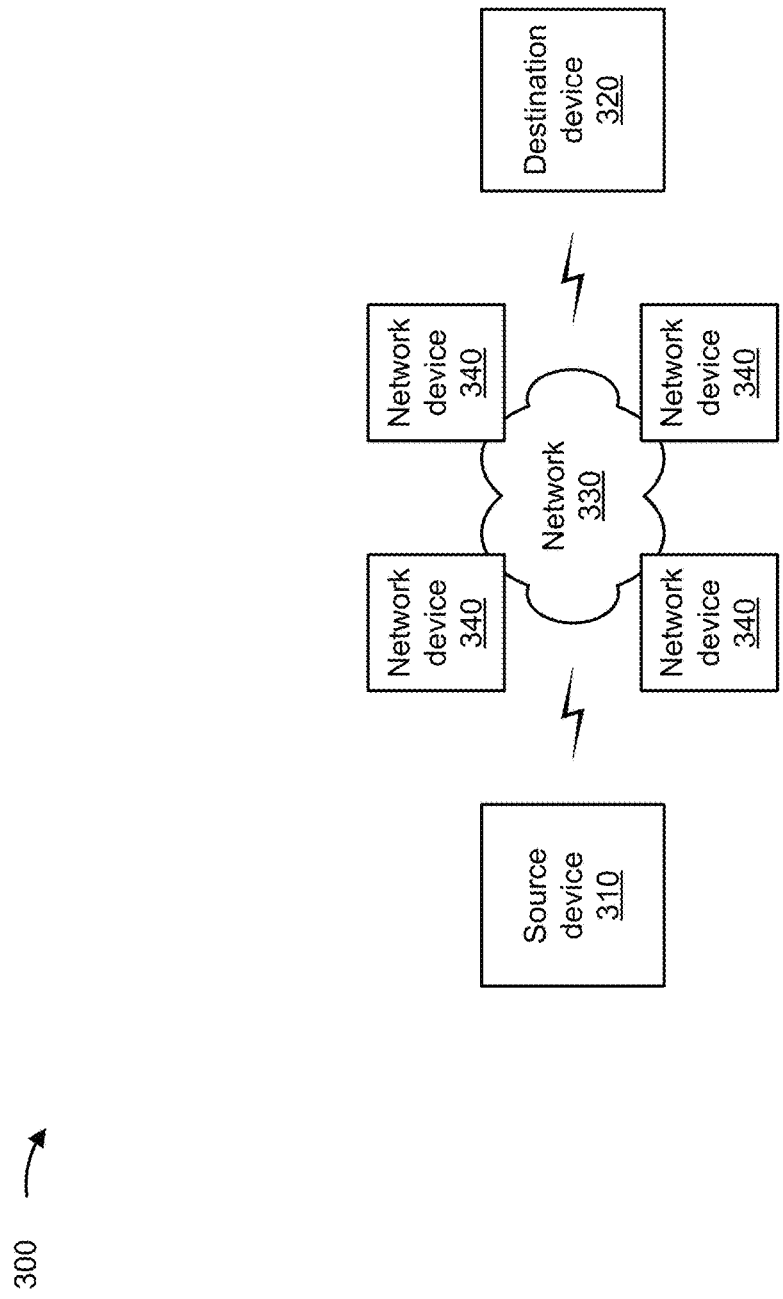
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a source device 310, a destination device 320, a network 330, and one or more network devices 340 (referred to herein individually as network device 340 or collectively as network devices 340). Devices of environment 300 may interconnect via wired connections, wireless connections, or a combination of wired and wireless connections.

Source device 310 and/or destination device 320 may include one or more user devices. For example, source device 310 and/or destination device 320 may include one or more devices capable of receiving, generating, storing, processing, and/or providing network traffic associated with an application and/or a session, as described herein. Source device 310 and/or destination device 320 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device. In some implementations, source device 310 and/or destination device 320 may be a cloud-based platform of a cloud computing environment, a web-based platform, an online platform, and/or the like. Source device 310 and/or destination device 320 may correspond to the first endpoint device and the second endpoint device described in connection with example implementation 100.

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network device 340 includes one or more devices (e.g., one or more traffic transfer devices) capable of processing and/or transferring traffic between endpoint devices (e.g., source device 310 and destination device 320). For example, network device 340 may include a firewall, a router, a gateway, a switch, a hub, a bridge, a reverse proxy, a server (e.g., a proxy server), a security device, an intrusion detection device, a load balancer, or a similar device. In some implementations, network device 340 may be a physical device implemented within a housing, such as a chassis. In some implementations, network device 340 may be a virtual device implemented by one or more computer devices of a cloud computing environment or a data center.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
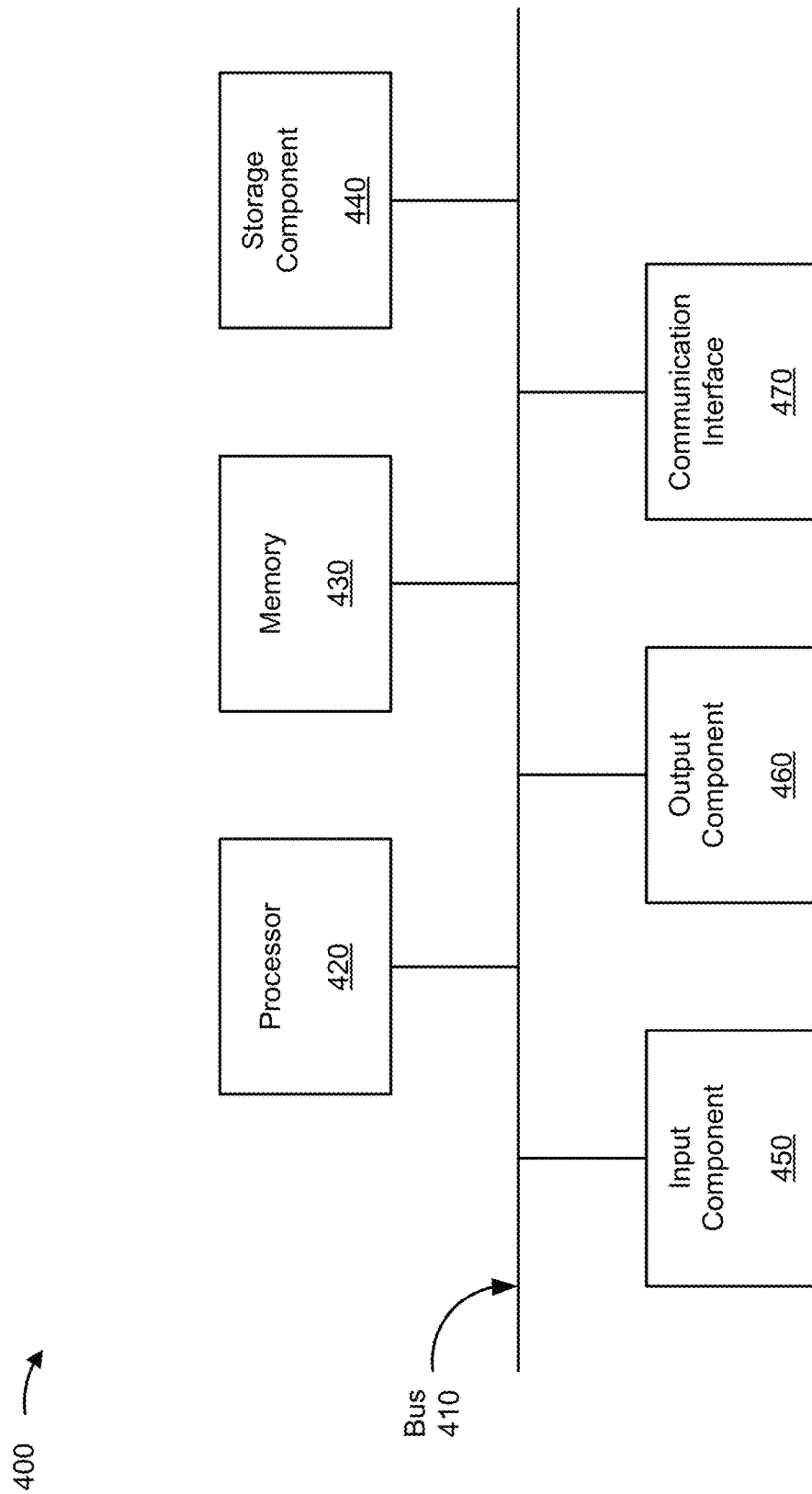
FIGS. 4-5 are diagrams of example components of one or more devices of FIG. 3.

FIG. 4 is a diagram of example components of a device 400. Device 400 may correspond to source device 310, destination device 320 and/or network device 340. In some implementations, source device 310, destination device 320 and/or network device 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive. Storage component 440 may be used to store and/or implement the security policy database of example implementation 100.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
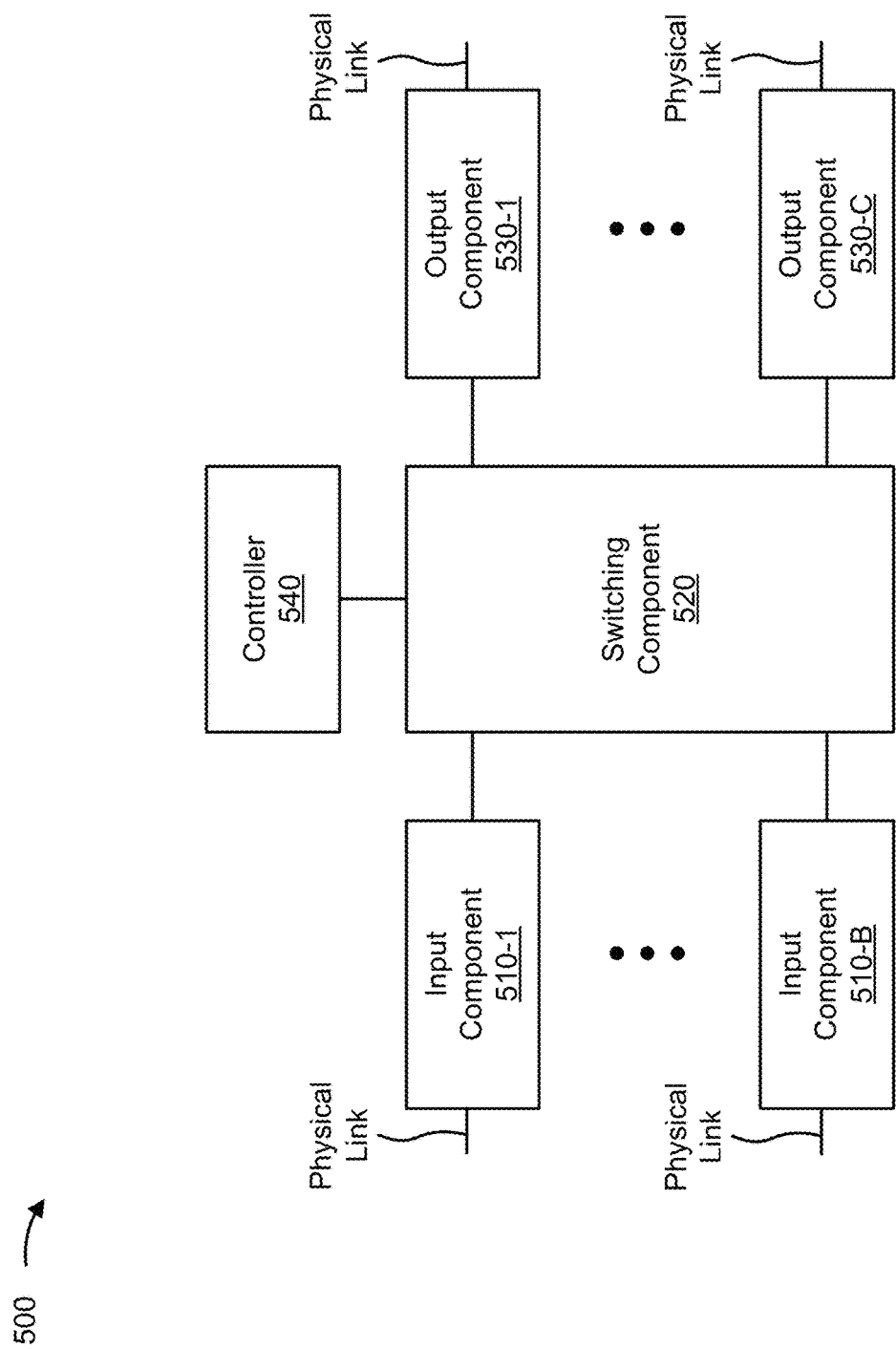

FIG. 5 is a diagram of example components of a device 500. Device 500 may correspond to device 310, destination device 320 and/or network device 340. In some implementations, source device 310, destination device 320 and/or network device 340 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
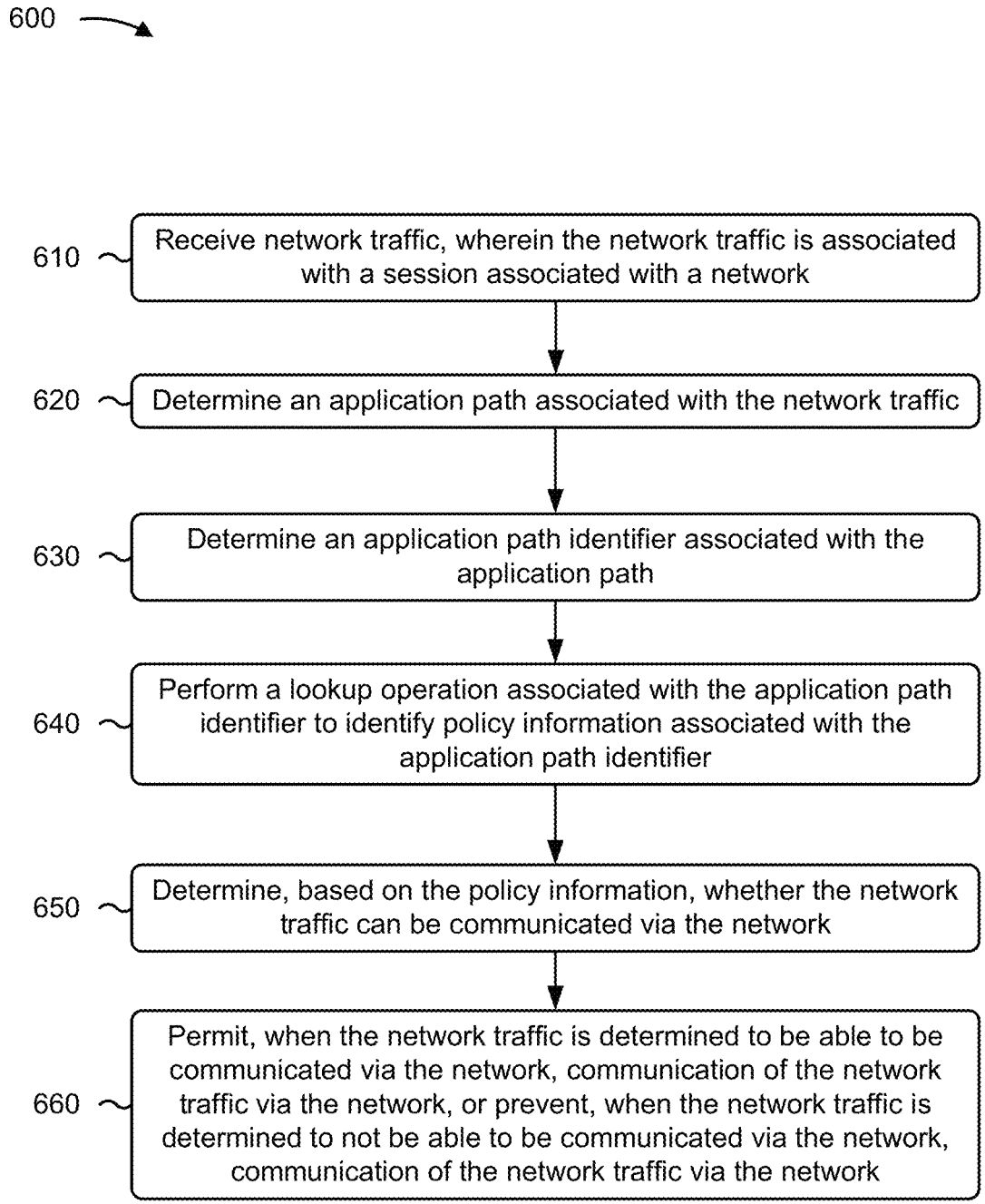
FIGS. 6-8 are flowcharts of one or more example processes associated with network traffic control based on an application path identifier.

FIG. 6 is a flow chart of an example process 600 for network traffic control based on an application path identifier. In some implementations, one or more process blocks of FIG. 6 may be performed by a network device (e.g., network device 340). In some implementations, one or more process blocks of FIG. 6 may be performed by another device or a group of devices separate from or including the network device, such as a source device (e.g., source device 310), a destination device (e.g., destination device 320), and/or the like.

As shown in FIG. 6, process 600 may include receiving network traffic, wherein the network traffic is associated with a session associated with a network (block 610). For example, the network device (e.g., using processor 420, memory 430, storage component 440, input component 450, output component 460, communication interface 470, input component 510, switching component 520, output component 530, controller 540, and/or the like) may receive network traffic, as described above. In some implementations, the network traffic is associated with a session associated with a network.

As further shown in FIG. 6, process 600 may include determining an application path associated with the network traffic (block 620). For example, the network device (e.g., using processor 420, memory 430, storage component 440, input component 450, output component 460, communication interface 470, input component 510, switching component 520, output component 530, controller 540, and/or the like) may determine an application path associated with the network traffic, as described above.

As further shown in FIG. 6, process 600 may include determining an application path identifier associated with the application path (block 630). For example, the network device (e.g., using processor 420, memory 430, storage component 440, input component 450, output component 460, communication interface 470, input component 510, switching component 520, output component 530, controller 540, and/or the like) may determine an application path identifier associated with the application path, as described above.

As further shown in FIG. 6, process 600 may include performing a lookup operation associated with the application path identifier, to identify policy information associated with the application path identifier (block 640). For example, the network device (e.g., using processor 420, memory 430, storage component 440, input component 450, output component 460, communication interface 470, input component 510, switching component 520, output component 530, controller 540, and/or the like) may perform a lookup operation associated with the application path identifier, to identify policy information associated with the application path identifier, as described above.

As further shown in FIG. 6, process 600 may include determining, based on the policy information, whether the network traffic can be communicated via the network (block 650). For example, the network device (e.g., using processor 420, memory 430, storage component 440, input component 450, output component 460, communication interface 470, input component 510, switching component 520, output component 530, controller 540, and/or the like) may determine, based on the policy information, whether the network traffic can be communicated via the network, as described above.

As further shown in FIG. 6, process 600 may include permitting, when the network traffic is determined to be able to be communicated via the network, communication of the network traffic via the network, or preventing, when the network traffic is determined to not be able to be communicated via the network, communication of the network traffic via the network (block 660). For example, the network device (e.g., using processor 420, memory 430, storage component 440, input component 450, output component 460, communication interface 470, input component 510, switching component 520, output component 530, controller 540, and/or the like) may permit, when the network traffic is determined to be able to be communicated via the network, communication of the network traffic via the network, or a network device may prevent, when the network traffic is determined to not be able to be communicated via the network, communication of the network traffic via the network as described above.

Process 600 may include additional implementations, such as any single implementation or any combination of implementations described below and/or in connection with one or more other processes described elsewhere herein.

In a first implementation, performing the lookup operation comprises locating, in a policy mapping and based on the application path identifier, an entry associated with the application path identifier, and obtaining policy information from the entry, wherein the policy information indicates whether the network traffic can be communicated via the network.

In a second implementation, alone or in combination with the first implementation, process 600 includes logging the application path identifier in association with whether the communication of the network traffic is permitted or prevented, wherein the logged application path identifier is logged in association with the policy information in the entry.

In a third implementation, alone or in combination with one or more of the first and second implementations, determining the application path identifier associated with the application path comprises identifying an application included in the application path; locating, in an application to application path identifier mapping and based on the application, an entry associated with the application; determining that an application path classification segment of the entry matches or corresponds to a portion of the application path; and obtaining, based on determining that the application path classification segment of the entry matches or corresponds to the portion of the application path, the application path identifier from the entry.

In a fourth implementation, alone or in combination with one or more of the first through third implementations, the application path classification segment includes at least one wildcard character.

In a fifth implementation, alone or in combination with one or more of the first through fourth implementations, the application path includes an application protocol and a communication protocol, wherein the application is included in the application protocol or the communication protocol.

In a sixth implementation, alone or in combination with one or more of the first through fifth implementations, the application path comprises at least one of a domain name system application; a transmission control protocol application; a user datagram protocol application; a secure socket layer application; a hypertext transfer protocol application; a transport layer security protocol application; a quick user datagram protocol Internet connection application; or a SOCKS application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
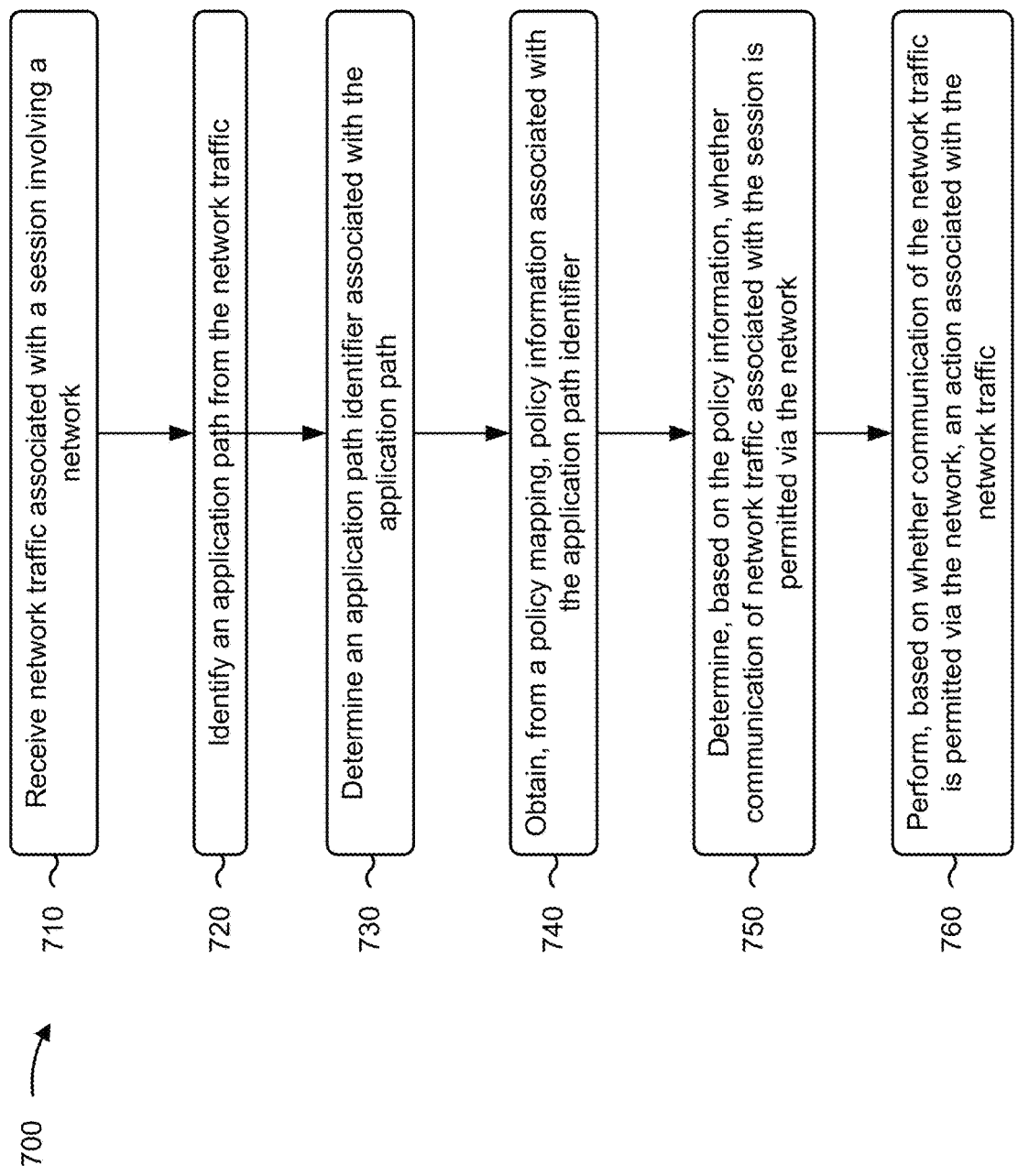

FIG. 7 is a flow chart of an example process 700 for network traffic control based on an application path identifier. In some implementations, one or more process blocks of FIG. 7 may be performed by a network device (e.g., network device 340). In some implementations, one or more process blocks of FIG. 7 may be performed by another device or a group of devices separate from or including the network device, such as a source device (e.g., source device 310), a destination device (e.g., destination device 320), and/or the like.

As shown in FIG. 7, process 700 may include receiving network traffic associated with a session involving a network (block 710). For example, the network device (e.g., using processor 420, memory 430, storage component 440, input component 450, output component 460, communication interface 470, input component 510, switching component 520, output component 530, controller 540, and/or the like) may receive network traffic associated with a session involving a network.

As further shown in FIG. 7, process 700 may include identifying an application path from the network traffic (block 720). For example, the network device (e.g., using processor 420, memory 430, storage component 440, input component 450, output component 460, communication interface 470, input component 510, switching component 520, output component 530, controller 540, and/or the like) may identify an application path from the network traffic, as described above.

As further shown in FIG. 7, process 700 may include determining an application path identifier associated with the application path (block 730). For example, the network device (e.g., using processor 420, memory 430, storage component 440, input component 450, output component 460, communication interface 470, input component 510, switching component 520, output component 530, controller 540, and/or the like) may determine an application path identifier associated with the application path, as described above.

As further shown in FIG. 7, process 700 may include obtaining, from a policy mapping, policy information associated with the application path identifier (block 740). For example, the network device (e.g., using processor 420, memory 430, storage component 440, input component 450, output component 460, communication interface 470, input component 510, switching component 520, output component 530, controller 540, and/or the like) may obtain, from a policy mapping, policy information associated with the application path identifier, as described above.

As further shown in FIG. 7, process 700 may include determining, based on the policy information, whether communication of network traffic associated with the session is permitted via the network (block 750). For example, the network device (e.g., using processor 420, memory 430, storage component 440, input component 450, output component 460, communication interface 470, input component 510, switching component 520, output component 530, controller 540, and/or the like) may determine, based on the policy information, whether communication of network traffic associated with the session is permitted via the network, as described above.

As further shown in FIG. 7, process 700 may include performing, based on whether communication of the network traffic is permitted via the network, an action associated with the network traffic (block 760). For example, the network device (e.g., using processor 420, memory 430, storage component 440, input component 450, output component 460, communication interface 470, input component 510, switching component 520, output component 530, controller 540, and/or the like) may perform, based on whether communication of the network traffic is permitted via the network, an action associated with the network traffic, as described above.

Process 700 may include additional implementations, such as any single implementation or any combination of implementations described below and/or in connection with one or more other processes described elsewhere herein.

In a first implementation, the policy mapping maps applications and application path identifiers to respective policy information.

In a second implementation, alone or in combination with the first implementation, the application path identifier is determined based on an entry in an application to application path identifier mapping In a third implementation, alone or in combination with one or more of the first and second implementations, the entry in the application to application path identifier mapping identifies at least one of an application included in the application path, one or more application path classification segments, or the application path identifier.

In a fourth implementation, alone or in combination with one or more of the first through third implementations, the application to application path identifier mapping was generated based on signature constructs that are part of a pre-packaged application signature package and user defined constructs that are configured for application path identifiers.

In a fifth implementation, alone or in combination with one or more of the first through fourth implementations, determining the application path identifier associated with the application path comprises identifying an application included in the application path and determining, based on the application and the application path, the application path identifier.

In a sixth implementation, alone or in combination with one or more of the first through fifth implementations, the process 700 includes forwarding, when communication of the network traffic is determined to be permitted, the network traffic via the network, or preventing, when communication of the network traffic is determined to not be permitted, the network traffic from being communicated via the network.

In a seventh implementation, alone or in combination with one or more of the first through sixth implementations, the network device implements a firewall of the network.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
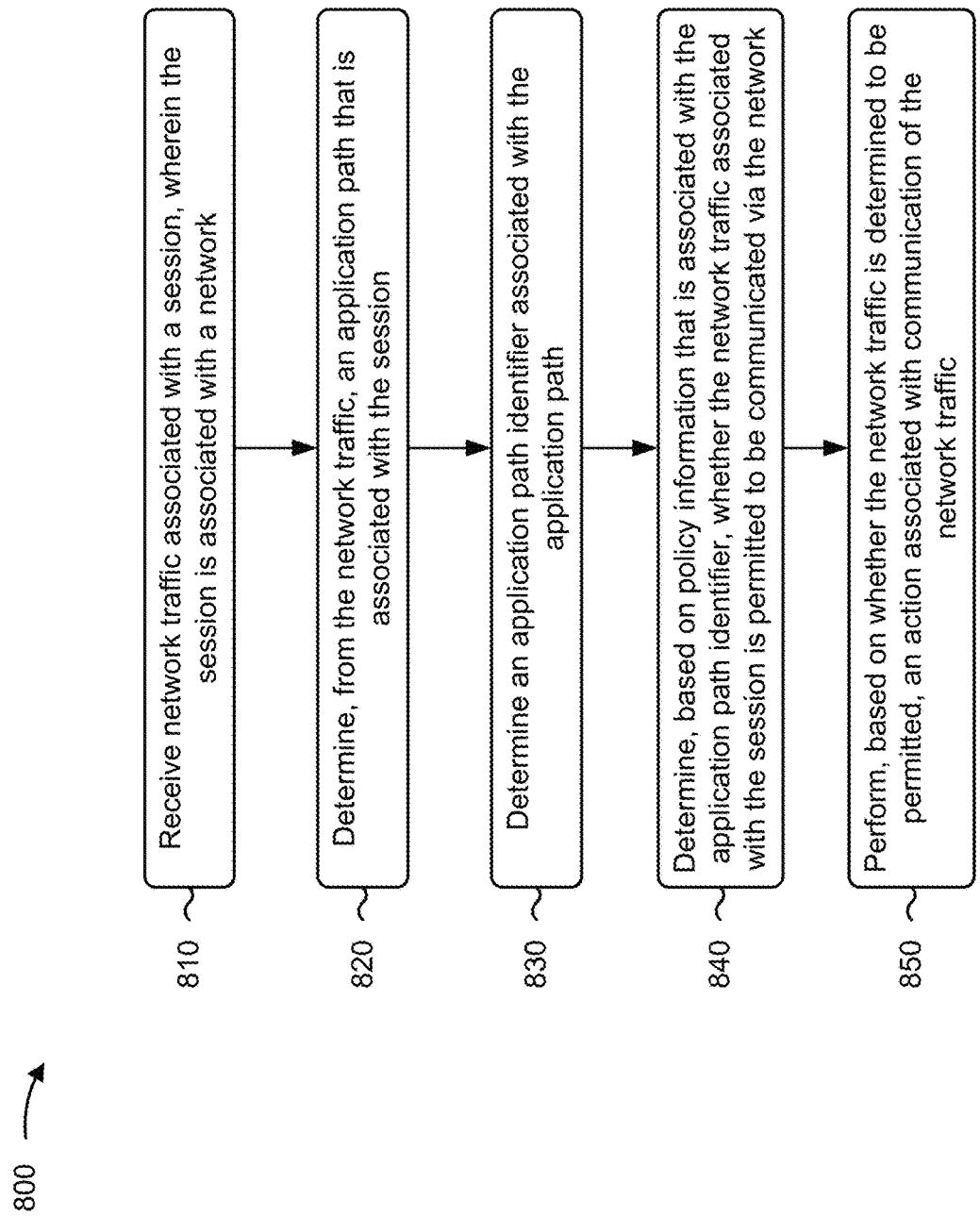

FIG. 8 is a flow chart of an example process 800 for network traffic control based on an application path identifier. In some implementations, one or more process blocks of FIG. 8 may be performed by a network device (e.g., network device 340). In some implementations, one or more process blocks of FIG. 8 may be performed by another device or a group of devices separate from or including the network device, such as a source device (e.g., source device 310), a destination device (e.g., destination device 320), and/or the like.

As shown in FIG. 8, process 800 may include receiving network traffic associated with a session, wherein the session is associated with a network (block 810). For example, the network device (e.g., using processor 420, memory 430, storage component 440, input component 450, output component 460, communication interface 470, input component 510, switching component 520, output component 530, controller 540, and/or the like) may receive network traffic associated with a session, as described above. In some implementations, the session is associated with a network.

As further shown in FIG. 8, process 800 may include determining, from the network traffic, an application path that is associated with the session (block 820). For example, the network device (e.g., using processor 420, memory 430, storage component 440, input component 450, output component 460, communication interface 470, input component 510, switching component 520, output component 530, controller 540, and/or the like) may determine, from the network traffic, an application path that is associated with the session, as described above.

As further shown in FIG. 8, process 800 may include determining an application path identifier associated with the application path (block 830). For example, the network device (e.g., using processor 420, memory 430, storage component 440, input component 450, output component 460, communication interface 470, input component 510, switching component 520, output component 530, controller 540, and/or the like) may determine an application path identifier associated with the application path, as described above.

As further shown in FIG. 8, process 800 may include determining, based on policy information that is associated with the application path identifier, whether the network traffic associated with the session is permitted to be communicated via the network (block 840). For example, the network device (e.g., using processor 420, memory 430, storage component 440, input component 450, output component 460, communication interface 470, input component 510, switching component 520, output component 530, controller 540, and/or the like) may determine, based on policy information that is associated with the application path identifier, whether the network traffic associated with the session is permitted to be communicated via the network, as described above.

As further shown in FIG. 8, process 800 may include performing, based on whether the network traffic is determined to be permitted, an action associated with communication of the network traffic (block 850). For example, the network device (e.g., using processor 420, memory 430, storage component 440, input component 450, output component 460, communication interface 470, input component 510, switching component 520, output component 530, controller 540, and/or the like) may perform, based on whether the network traffic is determined to be permitted, an action associated with communication of the network traffic, as described above.

Process 800 may include additional implementations, such as any single implementation or any combination of implementations described below and/or in connection with one or more other processes described elsewhere herein.

In a first implementation, the application path is parsed from the network traffic using a deep packet inspection.

In a second implementation, alone or in combination with the first implementation, the application path is determined from a plurality of protocol data units of the network traffic.

In a third implementation, alone or in combination with one or more of the first and second implementations, the application path identifier is associated with an application identified in the application path, and the application is: a domain name system application; a transmission control protocol application; a user datagram protocol application; a secure socket layer application; a hypertext transfer protocol application; a transport layer security protocol application; a quick user datagram protocol Internet connection application; or a SOCKS application.

In a fourth implementation, alone or in combination with one or more of the first through third implementations, process 800 includes forwarding, when communication of the network traffic is being determined to be permitted, the network traffic via the network, or preventing, when communication of the network traffic is determined to not be permitted, the network traffic from being communicated via the network.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, network traffic,
      wherein the network traffic is associated with a session associated with a network;
   determining, by the network device, an application path associated with the network traffic;
   determining, by the network device, an application path identifier associated with the application path,
      wherein determining the application path identifier comprises:
         locating, in an application to application path identifier mapping and based on an application identified from the application path, an entry associated with the application;
         determining that an application path classification segment of the entry matches or corresponds to a portion of the application path; and
         obtaining, based on determining that the application path classification segment of the entry matches or corresponds to the portion of the application path, the application path identifier from the entry;
   performing, by the network device, a lookup operation associated with the application path identifier to identify policy information associated with the application path identifier;
   determining, by the network device and based on the policy information, whether the network traffic can be communicated via the network; and
   permitting, by the network device, when the network traffic is determined to be able to be communicated via the network, communication of the network traffic via the network, or
   preventing, by the network device, when the network traffic is determined to not be able to be communicated via the network, communication of the network traffic via the network.

2. The method of claim 1, wherein performing the lookup operation comprises:

locating, in a policy mapping and based on the application path identifier, an entry associated with the application path identifier; and obtaining policy information from the entry,
wherein the policy information indicates whether the network traffic can be communicated via the network.

3. The method of claim 2, further comprising:
logging the application path identifier in association with whether the communication of the network traffic is permitted or prevented,
wherein the logged application path identifier is logged in association with the policy information in the entry.

4. The method of claim 1, wherein the application path classification segment includes at least one wildcard character.

5. The method of claim 1, wherein the application path includes an application protocol and a communication protocol,
wherein the application is included in the application protocol or the communication protocol.

6. The method of claim 1, wherein the application path comprises at least one of:
a domain name system application;
a transmission control protocol application;
a user datagram protocol application;
a secure socket layer application;
a hypertext transfer protocol application;
a transport layer security protocol application;
a quick user datagram protocol Internet connection application; or
a SOCKS application.

7. The method of claim 1, wherein the policy mapping maps applications and application path identifiers to respective policy information,
wherein the applications and application path identifiers include the application and the application path.

8. A network device, comprising:
one or more memories; and
one or more processors to:
receive network traffic associated with a session involving a network;
identify an application path from the network traffic;
determine an application path identifier associated with the application path,
wherein determining the application path identifier comprises:
locating, in an application to application path identifier mapping and based on an application identified from the application path, an entry associated with the application;
determining that an application path classification segment of the entry matches or corresponds to a portion of the application path; and
obtaining, based on determining that the application path classification segment of the entry matches or corresponds to the portion of the application path, the application path identifier from the entry;
obtain, from a policy mapping, policy information associated with the application path identifier;
determine, based on the policy information, whether communication of network traffic associated with the session is permitted via the network; and
perform, based on whether communication of the network traffic is permitted via the network, an action associated with the network traffic.

9. The network device of claim 8, wherein the policy mapping maps applications and application path identifiers to respective policy information.

10. The network device of claim 8, wherein the application path identifier is determined based on an entry in the application to application path identifier mapping.

11. The network device of claim 10, wherein the entry in the application to application path identifier mapping identifies at least one of:
the application included in the application path;
one or more application path classification segments; or
the application path identifier.

12. The network device of claim 10, wherein the application to application path identifier mapping was generated based on signature constructs that are part of a pre-packaged application signature package and user defined constructs that are configured for application path identifiers.

13. The network device of claim 8, wherein the one or more processors, when determining the application path identifier associated with the application path, are to:
identify the application included in the application path; and
determine, based on the application and the application path, the application path identifier.

14. The network device of claim 8, wherein the one or more processors, when performing the action, are to at least one of:
forward, when communication of the network traffic is determined to be permitted, the network traffic via the network, or
prevent, when communication of the network traffic is determined to not be permitted, the network traffic from being communicated via the network.

15. The network device of claim 8, wherein the network device implements a firewall of the network.

16. A non-transitory computer-readable medium storing instructions, the instructions comprising:
one or more instructions that, when executed by one or more processors, cause the one or more processors to:
receive network traffic associated with a session,
wherein the session is associated with a network;
determine, from the network traffic, an application path that is associated with the session;
determine an application path identifier associated with the application path,
wherein determining the application path identifier comprises:
locating, in an application to application path identifier mapping and based on an application identified from the application path, an entry associated with the application:
determining that an application path classification segment of the entry matches or corresponds to a portion of the application path; and
obtaining, based on determining that the application path classification segment of the entry matches or corresponds to the portion of the application path, the application path identifier from the entry;
determine, based on policy information that is associated with the application path identifier, whether the network traffic associated with the session is permitted to be communicated via the network; and perform, based on whether the network traffic is determined to be permitted, an action associated with communication of the network traffic.

17. The non-transitory computer-readable medium of claim 16, wherein the application path is parsed from the network traffic using a deep packet inspection.

18. The non-transitory computer-readable medium of claim 16, wherein the application path is determined from a plurality of protocol data units of the network traffic.

19. The non-transitory computer-readable medium of claim 16, wherein the application path identifier is associated with the application identified in the application path, wherein the application is:
 a domain name system application;
 a transmission control protocol application;
 a user datagram protocol application;
 a secure socket layer application;
 a hypertext transfer protocol application;
 a transport layer security protocol application;
 a quick user datagram protocol Internet connection application; or
 a SOCKS application.

20. The non-transitory computer-readable medium of claim 16, wherein the one or more instructions, that cause the one or more processors to perform the action associated with communication of the network traffic, cause the one or more processors to:
 forward, when communication of the network traffic is determined to be permitted, the network traffic via the network, or
 prevent, when communication of the network traffic is determined to not be permitted, the network traffic from being communicated via the network.

* * * * *